United States Patent
Strier et al.

[15] 3,706,601
[45] Dec. 19, 1972

[54] METHOD OF PRODUCING AN ELECTRODE WITH A POLYMER BINDER BY ROLLING

[72] Inventors: Murray P. Strier, Niagara Falls, N.Y.; Joseph S. Smatko, Santa Barbara, Calif.

[73] Assignee: McDonnell Douglas Corporation, Santa Monica, Calif.

[22] Filed: Jan. 28, 1970

[21] Appl. No.: 6,409

[52] U.S. Cl. ............. 136/20, 136/24, 136/27, 136/29, 136/31, 136/120 R, 136/126
[51] Int. Cl. ............................................. H01m 35/02
[58] Field of Search ...... 136/120 R, 125, 126, 30, 31, 136/27, 24, 120 R, 120 FC, 29, 20

[56] References Cited

UNITED STATES PATENTS

| | | | |
|---|---|---|---|
| 3,010,536 | 11/1961 | Plurien et al. | 136/120 FC UX |
| 3,536,537 | 10/1970 | Solomon | 136/126 |
| 3,003,015 | 10/1961 | Duddy | 136/30 |
| 3,457,113 | 7/1969 | Deibert | 136/86 |
| 3,042,732 | 7/1962 | Kordesch | 136/125 |

*Primary Examiner*—Winston A. Douglas
*Assistant Examiner*—M. J. Andrews
*Attorney*—Max Geldin

[57] ABSTRACT

Method for producing a battery electrode, particularly a zinc electrode, of improved strength and stability, and which has a porous cellular structure, by mixing an aqueous dispersion of electrode material such as zinc oxide, with an aqueous dispersion of a latex type polymer such as a fluorocarbon polymer, e.g., polytetrafluoroethylene, casting a film of such mixture, drying the film, sintering the dried film, and rolling such sintered film, to form a fibrous polymer structure binding the particles of electrode material. The resulting sintered and rolled film can be employed per se as an electrode, e.g., a zinc electrode, or such film can be ground and the ground particles then compacted to form an electrode.

18 Claims, 4 Drawing Figures

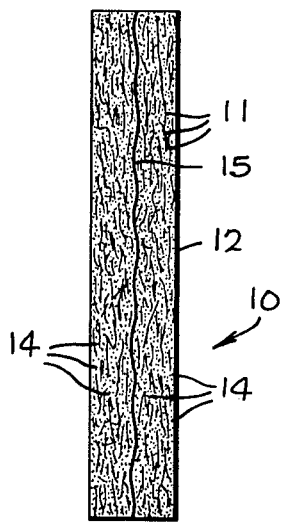
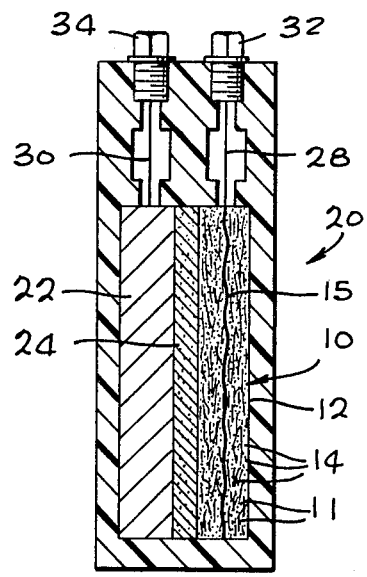
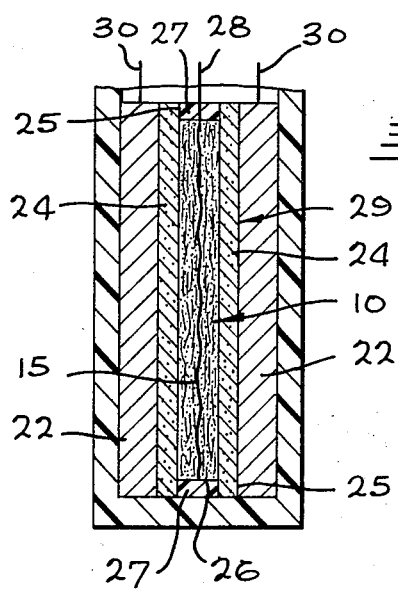

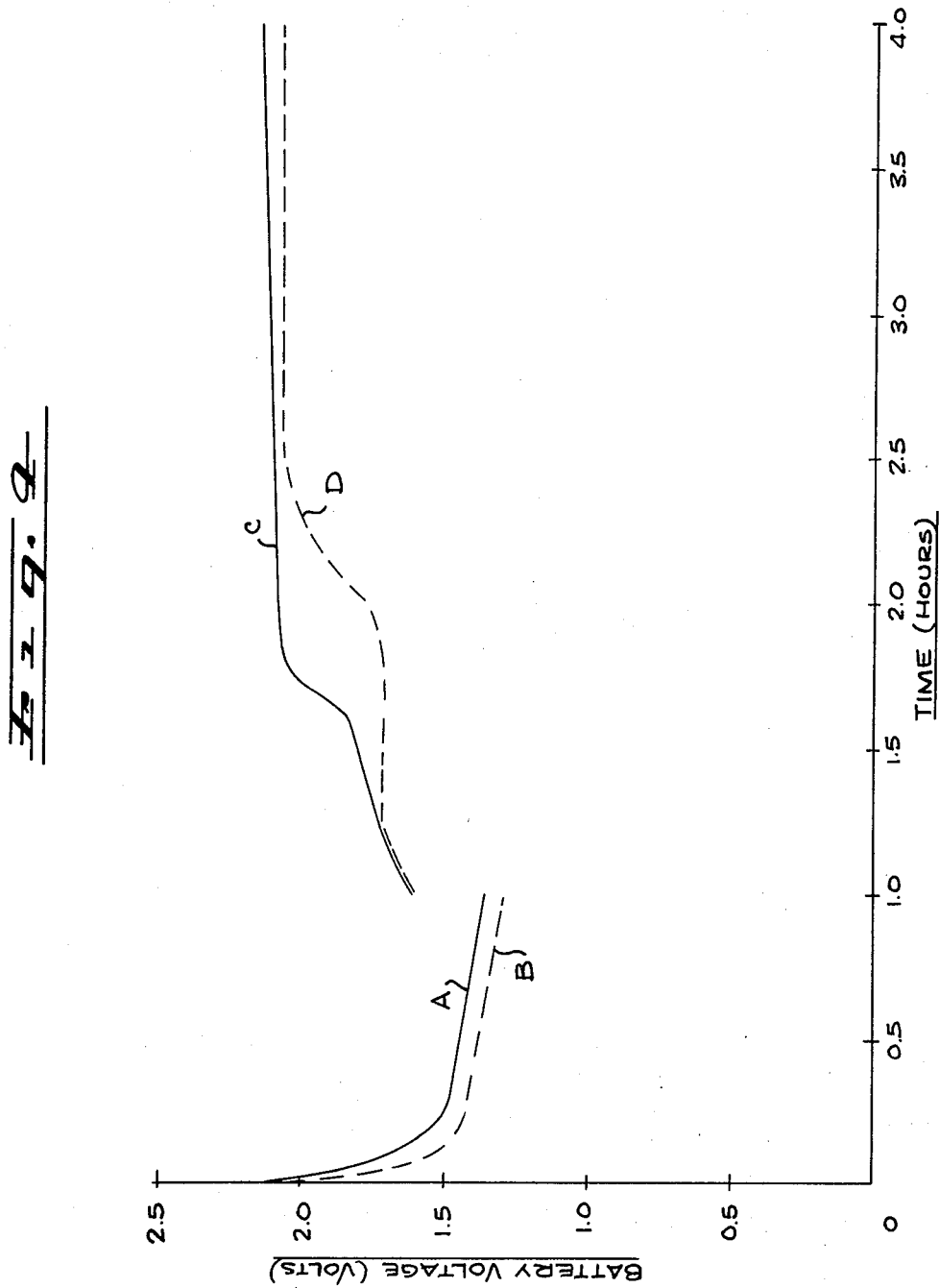

METHOD OF PRODUCING AN ELECTRODE WITH A POLYMER BINDER BY ROLLING

This invention relates to production of improved electrodes, particularly for use in a high energy density battery, and which is composed chiefly of inorganic material, and which is resistant to chemicals such as alkaline solutions, has good strength, low resistivity, and which will withstand repeated cycling at high efficiency, when employed in a battery both at ambient and at elevated temperatures of the order of 100° C. and above, and is particularly concerned with the provision of novel procedure for producing such electrodes, so that such electrodes contain a porous polymeric matrix, particularly of a fibrous nature, with active electrode material dispersed and bound in said matrix.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important air-borne applications, such high energy density batteries have many other applications such as in portable tools and appliances, television, radio and record players, engine starting, portable X-ray units and the like.

In high energy density batteries such as silver-zinc batteries, the electrodes are placed adjacent opposite sides of a membrane or separator which performs the function of retaining electrolyte, separating the electrodes, and permitting transfer of electrolyte ions while inhibiting migration of electrode ions which short circuit the battery. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

Zinc electrodes used e.g., in silver-zinc, nickel-zinc and zinc-air batteries, are conventionally made by pasting zinc oxide to a metal screen or by compressing zinc oxide powder into a compact form or pellet. However, the physical integrity of such zinc electrodes is difficult to maintain at room temperature and is particularly difficult to maintain at temperatures of the order of 100° C. and above. Such zinc electrodes have relatively short life due to slumping of the paste mixture, or compressed powder, and electrochemical changes during charging and discharging, and such electrodes are not in the form of a strong disc or shape having a set geometrical physical form and structure. Thus, for example, even when such zinc electrode is placed directly in contact with the battery separator, slumping and segregation of the electrode material toward the bottom of the electrode compartment occurs, making it difficult to maintain good uniform contact between the zinc electrode and the separator, and also between the zinc electrode and the electrode collector screen, and causing changes in electrode characteristics.

Thus the problems associated with conventional zinc electrodes in alkaline batteries include slumping and disintegration of the active electrode material, dendritic growth, chemical disolution of the electrode material and gassing, and passivation, the end result being a loss in capacity and shorting of the cell.

In U.S. Pat. No. 3,476,601 inorganic fibrous materials, such as fibrous potassium titanate, are incorporated as a support means in electrode materials, e.g., a zinc electrode, and the resulting mixture compacted to provide a zinc electrode of improved physical integrity.

In copending application Ser. No. 884,191 filed Dec. 11, 1969 of Frank C. Arrance there is disclosed and claimed production of strong essentially inorganic fibers, e.g., zinc oxide fibers, by mixing particulate inorganic material with a plastic binder such as polyphenylene oxide, in a flash drying solvent for such binder and forming a slurry, fiberizing the mixture of inorganic material and plastic binder by flashing the solvent from a stream of the slurry, and forming fibers of such inorganic material containing the plastic binder, and compacting such fibers to form a zinc electrode. Alternatively, such fibers can be sintered at high temperatures to remove organic residue, and the resulting sintered fibers compacted into an electrode structure.

The present invention constitutes a further improvement of the inventions described in the above patent and in the above copending application, for producing a battery electrode, particularly a zinc electrode, of high strength, which is highly reactive, and forms a stable electrode structure which is of a porous nature, and which remains stable and retains its capacity over a long period of charge-discharge cycling. The principles of the invention are particularly applicable to zinc electrodes and to the use of a fluorocarbon polymer, particularly polytetrafluoroethylene (Teflon), as porous binder for the active electrode material, as described in detail hereinafter, such materials being processed according to the invention in such manner as to form a film of polymer in fibrous form as matrix for the active electrode material. Briefly, the process for producing a battery electrode according to the invention comprises forming an aqueous mixture of particles of an electrode material and particles of a water dispersible latex type alkali-stable polymer, casting a film of said mixture, drying said film, sintering said dried film at temperature at which substantially no decomposition of said polymer occurs and rolling said sintered film to form a fibrous polymer structure binding said particles of electrode material.

In the resulting film, the polymer, e.g., fluorocarbon polymer, is essentially in fibrillar form and the electrode material, e.g., zinc oxide, particles are finely dispersed therein. Such film can be employed directly as an electrode in a battery such as a high energy density battery, or alternatively such sintered and rolled film can be ground and the ground material then compacted into a desired electrode form. In either case, a porous or cellular electrode, e.g., zinc, structure is provided which is supported or bound by the polymeric, e.g., fluorocarbon, matrix.

The concept of the present invention is based on applicants' belief that the fundamental electrochemical reaction involving the active electrode material such as zinc, should be confined to within the smallest possible pocket so that migration of the oxidized form of the electrode metal is either eliminated or at least minimized. It is believed that the ideal condition is for a monolayer of electrolyte to engulf the metal surface of the electrode. The morphological structure of the electrode metal such as zinc should be such that it is opaque to chemical oxidation while being highly sensitive to electrochemical reactions.

The polymer, e.g. fluorocarbon polymer, or organic resinous material employed as binder according to the invention, forms a porous matrix which encapsulates the electrode material, e.g., zinc oxide. Such binder limits the amount of electrolyte available around, for example, the zinc electrode, which causes the zincate on discharge to precipitate as zinc oxide at a site close to the discharging metallic zone. Thus, the charge and discharge of the active zinc sites are maintained within so-called pockets to minimize slumping.

To produce the electrode material-binder combination, particularly the zinc oxide-polytetrafluoroethylene film according to the invention, a feature of the invention comprises employing aqueous dispersion or aqueous emulsion technology based on the mixing of a polymer such as a fluorocarbon, e.g., polytetrafluoroethylene, emulsion with an active electrode material such as a zinc oxide, suspension, in order to obtain fine dispersion of the active electrode material, such as zinc oxide, substantially uniformly throughout the polymer binder or matrix. By employing such aqueous dispersion technology, a relatively thick film of the electrode material-binder aqueous dispersion can be cast, and such film dried, sintered and finally rolled to provide the fibrous binder structure engulfing or encapsulating the particles of active electrode material, e.g., zinc oxide.

The organic polymeric materials incorporated with the electrode material according to the invention for production of an improved electrode, may include any latex type polymer or elastomer, which is resistant to alkali, and which preferably has high temperature resistance. Included among suitable polymers for this purpose are fluorocarbon polymers, such as vinylidene fluoride polymers and copolymers, e.g., vinylidene fluoride polymer (marketed as Kynar), copolymers of hexafluoropropylene and vinylidene fluoride (marketed as Viton), trifluorochloroethylene polymer (KEL–F), polytetrafluoroethylene (Teflon), fluorinated ethylene-propylene copolymer (FEP), polyphenylene oxide, polysulfone, rubber polymers such as neoprene rubber, synthetic polyisoprene, acrylonitrile-butadiene-styrene (ABS), butadiene-acrylonitrile copolymer (Hycar) and natural rubber, acrylic polymers such as acrylate and methacrylate polymers, the vinyl polymers such as poly vinyl chloride and vinyl chloride-vinyl acetate copolymers, and the like. The preferred polymers are the fluorocarbons, particularly polytetrafluoroethylene, which has high temperature resistance and good resistance to alkali, and which is commercially available as an aqueous dispersion or emulsion.

Although the invention is designed particularly for production of zinc electrodes, employing zinc oxide in particulate or powder form, other high energy density battery electrodes can also be produced according to the invention, employing as active electrode material cadmium oxide, nickel oxide or silver oxide in powder or particulate form. As pointed out below, the particulate electrode materials are preferably employed in aqueous suspension or aqueous dispersion. It has also been found that effective electrodes can be produced by employing mixtures of the above noted active electrode materials such as mixtures of zinc oxide and cadmium oxide. It has also been found that efficient zinc electrodes can be produced according to the invention by including a minor portion of lead in finely dispersed form in the aqueous suspension containing zinc oxide particles, either as Pb, PbO, $PbO_2$ or $Pb_3O_4$ employing about 0.1 to about 15 percent of such lead oxide and about 85 to about 99.9 percent zinc oxide by weight of total electrode material. It has been found that the $Pb^{++}$ ion in such lead-containing zinc electrodes functions as an inhibitor of zinc dendrite growth.

In preferred practice an aqueous dispersion or suspension of the electrode material, such as an aqueous suspension of zinc oxide is provided, such suspension preferably having a consistency comparable to heavy cream, and an aqueous emulsion or dispersion of the organic polymer or binder, e.g., an aqueous emulsion of polytetrafluoroethylene, is added to the aqueous dispersion of the electrode material, to form an aqueous homogeneous mixture or dispersion of the electrode material particles and the organic polymer particles. For this purpose it is preferred to employ relatively small particle size particulate electrode material such as zinc oxide, and particulate polymeric material such as polytetrafluoroethylene. Thus, in preferred practice the particle size of the electrode material such as zinc oxide can range from about 0.1 to about $10\mu$ and the particle size of the polymeric binder material such as polytetrafluoroethylene preferably ranges from about 0.01 to about $10\mu$.

The solids concentration in the resulting aqueous slurry, including electrode material and polymer or resin binder, can very substantially, and can range for example from about 10 to about 75 percent solids. The proportion of electrode material such as zinc oxide to binder, e.g., fluorocarbon polymer, employed is such that the mixture contains a major proportion of electrode material such as zinc oxide and a minor proportion of the polymeric binder material, so as to result in an electrode film produced according to the invention having a sufficient concentration of the active electrode material, e.g., zinc component. Generally, the mixture or slurry contains about 75 to about 99.5 percent electrode material, such as zinc oxide, and about 0.5 to about 25 percent polymer by weight of total solids, preferably about 85 to about 97 percent electrode material and about 3 to about 15 percent polymer. A particularly successful mixture found according to the invention contains about 95 percent electrode material such as zinc oxide and about 5 percent of polymeric material, e.g., fluorocarbon polymer such as polytetrafluoroethylene.

Although in preferred practice an aqueous dispersion or suspension of the electrode material such as zinc oxide and the polymer material such as polytetrafluoroethylene are separately provided and mixed, if desired, zinc oxide particles can be incorporated in an aqueous dispersion of the polymer binder, employing a sufficient amount of water to maintain both the electrode material and the polymer in fine dispersion, particularly in the concentrations of these materials noted above. Also, a thick highly concentrated aqueous mixture of electrode material such as zinc oxide can be produced and the aqueous dispersion of polymer material added to it.

The homogeneous slurry or mixture of electrode material such as zinc oxide and polymer such as polytetrafluoroethylene is cast on a suitable preferably flat surface, e.g., a glass plate, as by pouring the slurry of mixture onto such plate employing suitable means such as a casting knife or doctor blade to obtain a desired thickness of film. However, any suitable casting procedure can be employed.

As an alternative, an aqueous paste of electrode material such as zinc oxide can be blended with the aqueous polymer emulsion, and the resulting mixture in the form of a paste can be extruded in the form of a film.

The resulting cast or extruded film is then dried either at ambient temperature or at elevated temperature, preferably the latter, and at elevated temperature of say about 60° to about 100° C., such drying generally being carried out for a period of from about 2 to about 24 hours.

The resulting dried film of electrode material-polymer matrix is then subjected to sintering at a temperature which does not cause decomposition of the polymer binder, but which functions to soften the polymer and to cause interparticle bonding or welding of the polymer or resin matrix to form continuous chains. Sintering temperatures, depending upon the particular electrode material and the particular polymer binder employed, generally range from as low as about 100° C., or even lower, to about 375° C., preferably from about 230° to about 375° C. Thus, for example when using rubber polymers as binders, sintering can be carried out at lower temperatures of the order of about 100° to about 150° C., and when employing fluorocarbons such as polytetrafluoroethylene, sintering temperatures can range from about 260° to about 375° C. Usually such sintering is carried out for a period of from about 10 minutes up to about 2 hours.

Following cooling of the resulting sintered film, and as a particular and unique feature of the invention, the film is then subjected to rolling, that is the application of a roll, such as a cylinder or cylindrical rod, over the surface of the film. The advantage of such rolling is that it fully develops the fibrous structure in the polymer or binder, thereby strengthening the bond between the electrode material, e.g., zinc, and binder component, resulting in a more stable composite structure. The rolling can be carried out once or several times over the sintered film, in various directions, for example the film, e.g., a sintered zinc oxide-polytetrafluoroethylene composite film, can be subjected to application of a roll or cylindrical rod at least four times both in longitudinal and transverse directions. Thus, for example, a 1½ to 2 inch diameter stainless steel rod 6 inches in length can be used to roll a film containing a 25 to 50 gram quantity of sintered zinc oxide-polytetrafluoroethylene mixture.

Alternatively, such rolling can be carried out by working the film mass on a rubber mill, preferably heated, the rolls in the rubber mill, especially if set at different speeds, creating the necessary force to stretch the binder into fibrillar or fibrous forms. Thus, a roll speed differential of 1:1 to 3:1 between the rolls can be employed.

It has been found that by application of rolling procedure as described above to the electrode material-polymer mixture, e.g. zinc oxide-polytetrafluoroethylene mixture, or film, the fibrous nature of the resultant composite film is substantially increased. Although satisfactory electrodes can be produced by cooling the film to room temperature (about 20° C.) following sintering, in preferred practice the film is maintained at elevated temperature up to about 300° C., e.g. of the order of about 200° to about 300° C. with the roller preferably heated to the same temperature. Such hot rolling results in stronger films and electrodes, because a better fibrillar structure is thus obtained. Such rolling procedure also simultaneously increases the tensile strength of the resultant composite film several times over the strength of the same film prior to rolling. Heating of the film and/or the roller during the rolling operation is not necessary, although such heating is preferred in that it aids in softening the polymer or resin and enhances stretching of the polymer to produce the desired fibrous structure. The rolling procedure can take place over a period of from about 1 to about 10 minutes, the period of rolling depending upon the amount of shear stress applied and the amount of heat, if any, which is used during the rolling procedure.

The resulting film after rolling and cooling is strong and relatively flexible and as result of the employment of the above noted aqueous emulsion principles together with the fibrillation technique noted above including particularly the rolling step, intimate, uniformly dispersed electrode material such zinc oxide, cadmium oxide, mixtures thereof, or zinc oxide and lead oxide mixtures, are provided within a cellular type matrix or polymer structure, providing optimum utilization and stability of active electrode materials. A particular advantage of the fibrillated polymer, e.g., polytetrafluoroethylene binder achieved by the rolling procedure herein described is that the relatively long fibriles of the polymeric material prevents coalescence of electrode material such as zinc or cadmium into large crystals with attendant loss in capacity and cell life.

The sintered and rolled composite film of fibrous polymeric material containing dispersed particles of electrode material such as zinc oxide can be employed per se as a battery electrode, e.g. as a zinc electrode in a silver-zinc, nickel-zinc or zinc-air battery, preferably when pressed into or onto a conducting screen or grid. Such sheets as cast are relatively flexible and can have a thickness e.g., ranging from about 3 to about 10 mils. Such sheets, preferably after hot rolling, can be stacked and rolled again to form thicker sheets which can be used as electrodes, preferably after incorporation of a conducting grid. However, in order to provide electrodes of more readily controlled and/or greater thicknesses, it is preferred to grind or shred the sintered and rolled composite film of electrode material-polymer mixture down to a suitable particle size, e.g., a particle size ranging from about 150 to about 8 mesh, preferably a relatively fine mesh size of the order of about 80 mesh. The ground material is then subjected to compaction in a suitable die, e.g., under pressures of say about 2,000 to about 25,000 psi, to form electrodes of controlled thickness, e.g. ranging from about 0.005 to about 0.100 inch, and over, e.g., up to about 0.25 inch in thickness. In the case particularly of the production of zinc oxide electrodes, after grinding the sintered and rolled film of zinc oxide-polymer binder such as polytetrafluoroethylene, additives such as a small amount of mercuric oxide or lead oxide can be incorporated, to enhance electrode performance. The resulting electrodes also have some flexibility permitting slight bending thereof, but are not as flexible as the rolled and sintered film prior to grinding.

The electrode material-polymer-matrix electrodes of the invention, although flexible, are strong stable electrodes having a porous cellular structure composed of a fibrous polymer matrix having particles of active electrode material dispersed uniformly throughout the matrix and bound therein.

Upon incorporation of electrodes formed according to the invention, e.g., a zinc electrode, into a battery such as a silver-zinc battery, it has been found that significantly higher discharge curves are obtained as compared to control cells containing conventional zinc electrodes. It is also significant that during charging, employing for example a zinc electrode according to the invention, a fully charged voltage condition is reached in substantially less time than in the case of the conventional zinc electrode, as will be pointed out in further detail hereinafter.

The invention will be more readily understood by the description below taken in connection with the accompanying drawing wherein;

FIG. 1 illustrates an improved electrode structure, e.g., a zinc electrode, produced employing the composite of electrode material and polymer matrix material and having the fibrillar structure according to the invention process;

FIG. 2 illustrates a battery embodying the improved zinc electrode of FIG. 1;

FIG. 3 illustrates a battery containing an improved zinc electrode according to the invention, the zinc electrode being sandwiched between two separators, forming a "wafer" type construction; and FIG. 4 is a plot giving a charge-discharge comparison between batteries containing the cellular type zinc electrode produced according to the invention, and conventional zinc electrodes.

The drawings are exaggerated for purposes of clarity.

The zinc electrode illustrated at 10 in FIG. 1 of the drawing is composed of compacted and homogeneously distributed polymer fibers 11 such as polytetrafluoroethylene fibers, forming a porous matrix indicated at 12, with particles of zinc oxide indicated at 14, homogeneously dispersed or distributed throughout the matrix, and compressed on a conductive screen or grid 15.

Numeral 20 of FIG. 2 represents a battery of the high energy density type containing the improved zinc electrode 10 of FIG. 1 according to the invention, and a conventional silver electrode 22, with a separator 24, preferably an inorganic separator of the types described hereinafter, disposed between the electrodes 10 and 22. Zinc and silver electrodes 10 and 22 respectively are connected by means of lead wires 28 and 30, to terminals 32 and 34, respectively, of the battery.

It will be understood, of course, that one or a plurality of zinc electrodes 10 can be employed together with one or a plurality of positive, e.g., silver, electrodes 22, with a separator such as 24 between adjacent pairs of zinc and silver electrodes, to form either single plate or multiplate batteries, to give the desired electrical capacity.

The separator 24 can be composed of inorganic or organic materials, and is preferably inorganic. Inorganic separator materials which can be used include a variety of porous inorganic or ceramic substances. Thus, for example, suitable inorganic separator materials include insoluble metal oxides of zirconium and titanium. Other inorganic separators which can be employed are sintered aluminosilicates, especially the alkali metal and alkaline earth metal aluminosilicates, as described in U.S. Pat. No. 3,379,570.

Other types of inorganic separators which can be employed include those in the form of a sintered porous solid solution of magnesium silicate and a member selected from the group consisting of zinc silicate and iron silicate, including the naturally occurring magnesium-iron silicate known as the mineral olivine, as described in U.S. Pat. No. 3,446,668. An olivine separator of this type can be prepared for example, by sintering at 1,200° C. a natural olivine consisting essentially of 41.4% $SiO_2$, 49.3% MgO and 7.7 percent iron oxide (FeO and $Fe_2O_3$) by weight, the remainder consisting essentially of trace amounts of CaO and $Cr_2O_3$.

Also, there can be employed the inorganic separators in the form of a sintered porous solid solution of an aluminum-bearing material such as aluminum oxide, and a substance selected from the group consisting of chromium, cobalt, nickel, magnesium, calcium and iron-bearing materials, e.g., amixture of alumina and chromic oxide, as described in U.S. Pat. No. 3,446,669.

Still another form of inorganic separator which can be employed according to the invention are porous sintered separators consisting essentially of a solid solution of a major portion of magnesium oxide and a minor proportion of an oxide such as zirconium dioxide, chromic oxide, aluminum oxide, titanium dioxide, and certain other oxides, as described in copending application Ser. No. 727,394, filed May 8, 1968 of Frank C. Arrance, et al, now U.S. Pat. No. 3,575,727.

Also, inorganic separator materials derived from natural chromite, termed ferrochromite, and containing oxides of iron, magnesium, aluminum and chromium and formed in to a sintered solid solution, as described and claimed in copending application Ser. No. 727,678 of Frank C. Arrance, filed May 8, 1968, now U.S. Pat. No. 3,539,394 can be employed.

As further examples of inorganic separator materials which can be employed are sintered zirconia (zirconium dioxide) separators, e.g., calcia stabilized zirconia, and sintered alumina separators.

Preferred inorganic separator materials are those selected from the group consisting of (a) a solid solution of magnesium silicate and iron silicate, including olivine, (b) zirconia, (c) a solid solution of a major portion of magnesium oxide and a minor portion of an oxide selected from the group consisting of zirconium dioxide, titanium dioxide, alumina and chromic oxide, (d) a solid solution of ferrochromite, (e) spinelloids and (f) alumina.

It will be understood that mixtures of the above materials can be employed.

The term "inorganic separator materials" or "sintered ceramic separator material" as employed herein is intended to denote any of the above noted sintered inorganic separator materials.

Also, an organic separator can be employed in a battery according to the invention. Suitable inert organic materials or plastics having suitable porosity characteristics which can be employed include, for example, microporous plastics such as nylon, Dynel (vinylchloride-acrylonitrile co-polymer), Teflon (polytetrafluoroethylene), cellophane, regenerated cellulose, sausage casing and the like. Although such organic separators can be employed, the strength, chemical inertness, temperature resistance and electrode support characteristics of the inorganic or ceramic separators are significantly superior.

Also, flexible substantially inorganic separators can by employed. For example, flexible separators as described in U.S. application Ser. No. 676,223, filed Oct. 18, 1967, of Frank C. Arrance, now U.S. Pat. No. 3,542,596 can be utilized in batteries according to the present invention, such flexible separators comprising a major portion of an inorganic or ceramic separator material of any of the types described above, such as olivine, a minor portion of potassium titanate in short fiber form, and a minor portion of a cured organic polymer, e.g., polyphenylene oxide, said cured organic polymer bonding the particles of said inorganic material and the potassium titanate fibers together, and forming a porous separator structure.

Additional examples of flexible substantially inorganic separators which can be employed are those described in u.S. application Ser. No. 676,224, filed Oct. 18, 1967, of C. Berger, et al., now abandoned, consisting essentially of a major portion of a porous inorganic material of any of the types described above, such as olivine, and a minor portion of a water coagulable organic fluorocarbon polymer such as vinylidene fluoride polymer, said polymer bonding the particles of the inorganic material together and forming a flexible membrane.

There can also be employed flexible porous separators as described in copending application Ser. No. 707,808, filed Feb. 23, 1968, by F. C. Arrance, et al., now abandoned in favor of continuation application Ser. No. 154,218, filed June 17, 1971, which can be box-shaped or in the form of an envelope to provide a compartment for a battery electrode, produced by applying on a flexible porous substrate, such as flexible sheets or mats of various materials including potassium titanate paper, asbestos, aluminosilicate sheets, and the like, a film comprising a mixture of an inorganic separator material such as zirconia, and an organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate. A further improved flexible bag separator can be used, employing a chrysotile asbestos matrix or bag initially impregnated with polyphenylene oxide, as described in the copending application Ser. No. 829,573, filed June 2, 1969, by F. C. Arrance, et al., now U.S. Pat. No. 3,625,770.

The inorganic and organic separators as above described should be of suitable porosity such that the separator walls function to retain electrolyte, and permit transfer of electrolyte ions but inhibit or impede transfer of electrode ions. A porosity in the range of from about 5 to about 50 percent, and most desirably in the range of about 10 to about 30 percent, is generally provided.

If desired, however, other types of inorganic or organic separators can be employed.

The improved zinc electrode particularly produced according to the invention can be employed in any type of battery such as a battery employing a zinc-silver couple or a zinc-nickel couple, together with separators of the type described and illustrated above. Also, the improved zinc electrode of the invention can be employed in zinc-fluid batteries, for example the so-called zinc-air or zinc-oxygen battery, employing a gas diffusion or catalyst electrode, e.g., a platinum electrode, and there is employed at 24 in FIG. 2 an ion conducting material such as a polystyrene type ion exchange membrane or ion conducting membrane such as zirconium phosphate.

The following are examples of practice of the invention.

EXAMPLE 1

An amount of 50 grams of U.S.P. grade zinc oxide having an average particle size of 0.3 $\mu$ is added with stirring to 200 cc of deionized water. The mixture is stirred initially at low speed until all lumps are dispersed and then the mixture is stirred at a maximum speed of 10,000 rpm for 15 minutes. Then, 4.4 grams of Dupont TFE aqueous dispersion T-30 of polytetrafluoroethylene (60 percent solids content) is added to the zinc oxide dispersion while mixing at low speeds over a 10 minute period.

The homogeneous slurry or aqueous dispersion of zinc oxide and polytetrafluoroethylene is poured on a Pyrex dish and dried over night at 90° C. in an electric oven. The dried mixture or film is sintered at 360° C. for 20 minutes. The sintered film is then cooled to about 220° C. and rolled using a stainless steel roller or rod also at about 220° C., of about 2 inch diameter by rolling the rod over the sintered zinc oxide-Teflon film 10 times both in the longitudinal and transverse directions. Such rolling is carried out for a period of about 10 minutes.

Following rolling, the film is cooled and removed from the plate and is ground down to about 80 mesh particle size, and to the resulting mixture is added an amount of mercuric oxide of 2 percent based on the total amount of zinc oxide and mercuric oxide in the composition.

The mixture is then compacted into electrodes in a die at 20,000 psi pressure to form a zinc electrode having a thickness of 0.050 inch with a silver conductor grid embedded at about midplane. In the die, the zinc electrode is pressed with potassium titanate paper placed on both sides of the electrode.

Referring to FIG. 3, the resulting zinc electrode 10 according to the invention is placed between two separators 24 each composed of a sintered solid solution of magnesium silicate and iron silicate, such separators being slightly larger than the zinc electrode sandwiched therebetween, the zinc electrode 10 being centered between the separators 24 so that the separators each have an overlapping edge portion 25 extending beyond the zinc electrode, such outwardly extending edge portions of the separators forming an edge cavity 26 around the zinc electrode, and an epoxy resin 27 is placed in the edge cavity around the zinc electrode, bonding the opposite separators together, thus insulating the enclosed zinc electrode, such electrode-separator unit or "wafer" type construction being described and claimed in copending application Ser. No. 576,009, filed Aug. 30, 1966, by Albert Himy, now U.S. Pat. No. 3,625,772.

The resulting electrode-separator unit 29 is assembled in a battery with two conventional silver electrodes 22 each positioned on opposite sides of the respective separators 24 of the unit, forming a silver-zinc battery containing one zinc electrode produced according to the invention as described above, and two conventional silver electrodes, and 30% KOH is added as electrolyte, forming a silver-zinc cell or battery.

After formation and initial capacity check, the battery is recharged and cycled. Cycling is performed employing a cycling regime of 1-hour discharge at 50 percent depth of discharge (C/2 rate) and 3-hour charge at C/5 rate.

A charge-discharge comparison between the battery described above containing a zinc electrode according to the invention and a battery constructed in the same manner but employing a conventional zinc electrode is made and such comparisons illustrated in FIG. 4 of the drawing.

Referring to the drawing, it is seen that after a charge cycle, substantially higher discharge voltages are obtained employing the zinc electrode of the invention, as illustrated by the curve marked A as compared to the battery containing the conventional zinc electrode as illustrated by the curve marked B.

Also, during the following 3 hour charge cycle, it is noted that the battery containing the zinc electrode according to the invention reaches the full charge voltage in less than one hour of the charge cycle, as illustrated by curve C, whereas a similar battery but containing a conventional zinc electrode requires about 1½ hours of charging to obtain its maximum charge voltage, as illustrated by curve D, the maximum charge voltage for the conventional battery being less than that for the battery containing the zinc electrode of the invention.

In another series of tests employing a silver-zinc battery containing a zinc electrode according to the invention as described above, and a similar battery but containing a conventional zinc electrode, discharge voltages over various numbers of cycles are obtained and such values shown in Table I below.

TABLE I

| Battery II Silver-Zinc Battery with Standard Zinc Electrode | | Battery I Silver-Zinc Battery with Zinc Electrode of the invention | |
|---|---|---|---|
| cycle no. | Discharge Plateau Voltage | cycle no. | Discharge Plateau Voltage |
| 1 | 1.50 | 1 | 1.50 |
| 7 | 1.42 | 7 | 1.42 |
| 36 | 1.41 | 36 | 1.41 |
| 66 | 1.43 | 66 | 1.45 |
| 90 | 1.46 | 90 | 1.48 |
| 120 | 1.47 | 120 | 1.50 |
| 162 | 1.45 | 162 | 1.50 |
| 182 | 1.42 | 189 | 1.47 |

The results of Table I above show substantially higher discharge voltages at corresponding cycle numbers, starting with cycle number 66, for the battery I containing the zinc electrode of the invention as compared to the battery II containing the conventional zinc electrode.

EXAMPLE 2

The procedure described in Example 1 above for producing the zinc oxide-polytetrafluoroethylene separator of the invention is repeated except for the following variations: 50 grams of reagent grade CdO in 80 grams of water is used in place of the ZnO suspension, 5 grams of Teflon emulsion (TFE aqueous dispersion T-30), sintering is performed at 330° C. for 25 minutes and rolling after sintering is carried out at 200° C. No HgO is added to the ground mix.

The resulting cadmium oxide-polytetrafluoroethylene electrode is incorporated in a battery of the type illustrated in FIG. 2 of the drawing, together with a conventional nickel electrode, with a woven nylon cloth between the nickel and cadmium electrodes.

The resulting battery with a 30% aqueous potassium hydroxide solution is electrolyte, remains stable over a large number of charge-discharge cycles with good electrical performance maintained during such cycling.

EXAMPLE 3

The procedure for obtaining a zinc oxide-polytetrafluoroethylene electrode according to Example 1 is repeated, except employing 50 grams of Merck Reagent Grade zinc oxide in place of the 50 grams U.S.P. grade zinc oxide of Example 1, and 150 grams water, and 3.3 grams of aqueous Teflon emulsion of Example 1, so that the aqueous mixture of zinc oxide and polytetrafluoroethylene contains about 96 percent zinc oxide and about 4 percent polytetrafluoroethylene, by weight of total solids.

The resulting zinc electrode has properties and characteristics similar to the zinc electrode of the invention produced in Example 1, when incorporated into a battery containing two conventional silver electrodes as described in Example 1.

EXAMPLE 4

The procedure of Example 1 is essentially repeated with the following changes: 48.5 grams of J. T. Baker Reagent ZnO and 1.5 grams of J. T. Baker Reagent CdO are mixed with 135 cc water to form an aqueous dispersion, and 11.2 grams polyphenylene oxide aqueous dispersion (40 percent solids) is added, providing an electrode composed of 91 percent active electrode material and 9 percent resin binder. The resulting cast film is rolled at 240° C. After the electrode is pressed, it is heated to 240° C. for 10 minutes to further strengthen the electrode.

The resulting zinc oxide-polyphenylene oxide electrode when incorporated in a silver-zinc battery has properties similar to those of the zinc oxide-polytetrafluoroethylene electrode of Example 1.

EXAMPLE 5

The procedure for producing the zinc electrode according to the invention described in Example 1 is repeated, except that neither the sintered film nor the roller employed during the rolling operation is heated during such operation.

The resulting electrode when incorporated in a silver-zinc cell with conventional silver electrodes has substantially the same operating characteristics as the zinc oxide-polytetrafluoroethylene electrode produced in Example 1.

EXAMPLE 6

The procedure of Example 1 is followed for producing the zinc oxide-polytetrafluoroethylene electrode except that in place of the 50 grams of zinc oxide there is employed a mixture of 44 grams of zinc oxide and 6 grams of PbO.

The resulting zinc oxide-lead oxide-polytetrafluoroethylene electrode when incorporated into a silver-zinc battery employing conventional silver electrodes, shows long life over a large number of charge-discharge cycles indicating minimum formation of zinc dendrites.

EXAMPLE 7

The procedure of Example 1 is repeated except employing in place of the aqueous dispersion of polytetrafluoroethylene an aqueous dispersion of polysulfone or an aqueous dispersion of a neoprene latex such as Du Pont latex No. 842A of 50 percent solids content.

The resulting zinc oxide-polymer binder electrodes have properties similar to the zinc oxide-polytetrafluoroethylene electrode produced according to the invention as described in Example 1.

EXAMPLE 8

The procedure of Example 1 is repeated except that the sintered and rolled film following removal from the glass plate is not ground, several such films being piled on top of each other to obtain a total film thickness of 0.050 inch. The resulting film is pressed onto a silver grid, and the resulting unit is employed as an electrode in a silver-zinc battery substantially as described in Example 1.

From the foregoing, it is seen that the invention provides procedure for producing strong, durable alkali resistant battery electrodes, particularly zinc electrodes, for use in high energy density batteries.

While we have described particular embodiments of our invention for purposes of illustration, it will be understood that various modifications and adaptations thereof may be made within the spirit of the invention, and hence the invention is not to be taken as limited except by the scope of the appended claims.

We claim:

1. The process for producing a battery electrode which comprises forming an aqueous mixture of particles of an electrode material and particles of a water dispersible latex type alkali-stable polymer, casting a film of said mixture, drying said film, sintering said dried film at temperature at which substantially no decomposition of said polymer occurs, rolling said sintered film to form a fibrous polymer structure binding said particles of electrode material, grinding the sintered and rolled film and compacting the resulting ground material to form an electrode.

2. The process as defined in claim 1, said electrode material being zinc oxide and said polymer being polytetrafluoroethylene, including forming said mixture by adding an aqueous emulsion of polytetrafluoroethylene to an aqueous suspension of zinc oxide, said zinc oxide particles having a particle size ranging from about 0.1 to about 10 $\mu$ and said polytetrafluoroethylene having a particle size ranging from about 0.01 to about 10 $\mu$, said drying being carried out at temperature of about 60° to about 100° C., for a period of from about 2 to about 24 hours, said sintering being carried out at temperature of about 230° to about 375° C. for a period from about 10 minutes to about 2 hours, said film being maintained at temperature ranging from about 200° to about 300° C. during said rolling, and including grinding the sintered and rolled film to a relatively fine mesh particle size prior to said compacting.

3. The process as defined in claim 1, said latex type polymer selected from the group consisting of fluorocarbon polymers, polyphenylene oxide, polysulfone, rubber polymers, acrylic and vinyl polymers.

4. The process as defined in claim 1, said electrode material being zinc oxide and said polymer being polytetrafluoroethylene.

5. The process as defined in claim 1, said electrode material being cadmium oxide and said polymer being polytetrafluoroethylene.

6. The process as defined in claim 1, said electrode material being zinc oxide and said polymer being a fluorocarbon polymer, said fluorocarbon polymer in said rolled and sintered film being in fibrillar form and said zinc oxide particles being finely dispersed therein.

7. The process as defined in claim 1, including forming said mixture by mixing an aqueous suspension of said electrode material with an aqueous emulsion of said polymer.

8. A process as defined in claim 7, employing an aqueous suspension of zinc oxide and an aqueous emulsion of polytetrafluoroethylene.

9. The process as defined in claim 1, said electrode material selected from the group consisting of zinc oxide, cadmium oxide, nickel oxide, silver oxide, mixtures thereof, and mixtures of zinc oxide and lead oxide.

10. A process as defined in claim 9, said polymer being a fluorocarbon polymer, said mixture of electrode material and polymer containing about 75 to about 99.5 percent electrode material and about 0.5 to about 25 percent polymer, by weight of total solids.

11. The process as defined in claim 10, said mixture of electrode material and polymer containing about 85 to about 97 percent electrode material and about 3 to about 15 percent polymer.

12. The process as defined in claim 11, said electrode material being zinc oxide and said polymer being polytetrafluoroethylene.

13. The process as defined in claim 12, including forming said mixture of electrode material and polymer by adding an aqueous emulsion of polytetrafluoroethylene to an aqueous suspension of zinc oxide, said zinc oxide particles having a particle size ranging from about 0.1 to about 10 μ and said polytetrafluoroethylene having a particle size ranging from about 0.01 to about 10 μ.

14. The process as defined in claim 9, said polymer being a fluorocarbon polymer, said drying being carried out at temperature of about 60° to about 100° C., for a period of from about 2 to about 24 hours, said sintering being carried out at temperature of about 100° to about 375° C. for a period from about 10 minutes to about 2 hours, said film being maintained at temperature ranging from about 20° C. to about 300° during said rolling.

15. The process as defined in claim 14, said sintering being carried out at a temperature ranging from about 230° to about 375° C., and said film being maintained at a temperature ranging from about 200° to about 300° C. during said rolling.

16. The process as defined in claim 15, said electrode material being zinc oxide and said polymer being polytetrafluoroethylene, including forming said mixture by adding an aqueous emulsion of polytetrafluoroethylene to an aqueous suspension of zinc oxide, said zinc oxide particles having a particle size ranging from about 0.1 to about 10 μ and said polytetrafluoroethylene having a particle size ranging from about 0.01 to about 10 μ.

17. The process as defined in claim 16, said rolling being carried out employing a 1 ½ inch to about 2 inch diameter stainless steel rod, over a 25 to about 50 gram quantity of said sintered film, said rod being heated to a temperature substantially the same as the temperature of said film during said rolling, to increase the fibrous characteristics of the polytetrafluoroethylene.

18. The process as defined in claim 16, wherein said rolling is carried out on a rubber mill, the rolls thereof being heated to a temperature substantially the same as the temperature of said film during said rolling with a roll speed differential of 1:1 to 3:1 between the rolls.

* * * * *